United States Patent [19]

Dombrowski et al.

[11] Patent Number: 4,552,046
[45] Date of Patent: Nov. 12, 1985

[54] CUTTING TOOL

[75] Inventors: David M. Dombrowski, Peabody; Kenneth J. Anastasi, Beverly, both of Mass.

[73] Assignee: General Electric Company, Lynn, Mass.

[21] Appl. No.: 613,934

[22] Filed: May 25, 1984

[51] Int. Cl.⁴ ............................................. B23B 29/04
[52] U.S. Cl. .................................. 82/36 A; 74/813 L
[58] Field of Search ....................... 82/36 A, 36 R; 29/48.5 A, 45, 46; 74/813 L, 822

[56] References Cited

U.S. PATENT DOCUMENTS

| | | | |
|---|---|---|---|
| 632,678 | 9/1899 | Dock | 407/90 |
| 3,368,265 | 2/1968 | Kirkham . | |
| 3,670,582 | 6/1972 | Herose | 74/813 L |
| 3,793,708 | 2/1974 | Watanabe | 29/568 |
| 3,838,500 | 10/1974 | Wirfelt | 29/568 |
| 3,981,607 | 9/1976 | Jorgensen | 408/146 |
| 4,024,777 | 5/1977 | Fogarty | 82/36 A |
| 4,065,223 | 12/1977 | Nelson | 407/114 |
| 4,169,690 | 10/1979 | Kendra | 407/90 |
| 4,188,162 | 2/1980 | Zweekly | 408/199 |
| 4,262,563 | 4/1981 | Brown | 82/36 A |
| 4,326,437 | 4/1982 | Fischer | 407/90 |
| 4,408,507 | 10/1983 | Szewczyk | 82/36 A |

FOREIGN PATENT DOCUMENTS

| | | | |
|---|---|---|---|
| 53-37989 | 4/1978 | Japan | 82/36 A |
| 54-20490 | 2/1979 | Japan | 82/36 A |
| WO81/3635 | 12/1981 | PCT Int'l Appl. | 82/36 R |

Primary Examiner—Leonidas Vlachos
Attorney, Agent, or Firm—Francis L. Conte; Derek P. Lawrence

[57] ABSTRACT

The present invention comprises a cutting tool having a cutting tool insert which may be automatically rotationally indexed. The cutting tool includes a shank and an indexable cutting tool insert rotatably connected to the shank. The insert includes a plurality of tips and a side surface therebetween. Indexing means including an index member slidably mounted to the shank are also provided. The index member includes a locking surface and a cam lobe. The indexing means is effective for rotating the insert upon extension of the index member so that the cam lobe pushingly engages the insert, and locking the insert in a stationary cutting position upon retraction of the index member so that the locking surface is securely positioned against the insert side surface. In an exemplary embodiment of the invention, the index member comprises a slider which is translatable only in a direction parallel to a longitudinal axis thereof. The slider also includes a recess disposed between the locking surface and the cam lobe which is effective for accommodating the insert tip as the insert is caused to be rotated by the cam lobe.

25 Claims, 10 Drawing Figures

CUTTING TOOL

BACKGROUND OF THE INVENTION

The present invention relates generally to cutting tools, and, more specifically, to a means for automatically indexing replaceable cutting tool inserts thereof.

Cutting tools used in metal cutting machines such as lathes, drills, milling machines and the like, are frequently formed with a removable and replaceable cutting tool insert made of a hard material, such as high-speed steel, carbide or ceramic, mounted upon a tool holder. Such inserts are formed with a number of cutting edges so that, when one edge becomes worn, the insert may be rotationally indexed to present a new cutting edge. After all the edges of each insert are worn, the insert is replaced.

Conventionally, such indexing of a cutting tool insert has been performed either manually or by relatively complex indexing means. For example, when one cutting edge of an insert has been used as desired, the machining operation is temporarily suspended while the insert is loosened on its holder, turned to present a new cutting edge to the work, accurately positioned, and then retightened on the holder. Indexing of a cutting tool insert, therefore, results in an undesirable loss of operating time.

Furthermore, with the advent of computer-aided manufacturing systems, improved means for indexing cutting tool inserts with increased speed while maintaining accuracy of position is desirable.

Accordingly, it is an object of the present invention to provide a new and improved cutting tool having an automatically indexable cutting tool insert.

Another object of the present invention is to provide a cutting tool having indexing means which is relatively compact and simple in construction.

Another object of the present invention is to provide a relatively simple indexing means having a minimum number of relatively moving parts.

Another object of the present invention is to provide indexing means effective for quickly and accurately indexing a cutting tool insert and locking the insert in a cutting position.

SUMMARY OF THE INVENTION

The present invention comprises a cutting tool having a cutting tool insert which may be automatically rotationally indexed. The cutting tool includes a shank and an indexable cutting tool insert rotatably connected to the shank. The insert includes a plurality of tips and a side surface therebetween. Indexing means including an index member movably mounted to the shank are also provided. The index member includes a locking surface and a cam lobe. The indexing means is effective for rotating the insert upon extension of the index member so that the cam lobe pushingly engages the insert, and locking the insert in a stationary cutting position upon retraction of the index member so that the locking surface is securely positioned against the insert side surface. In an exemplary embodiment of the invention, the index member comprises a slider which is translatable only in a direction parallel to a longitudinal axis thereof. The slider also includes a recess disposed between the locking surface and the cam lobe which is effective for accommodating the insert tip as the insert is caused to be rotated by the cam lobe.

BRIEF DESCRIPTION OF THE DRAWINGS

The novel features believed characteristic of the invention are set forth in the appended claims. The invention, itself, together with further objects and advantages thereof is more particularly described in the following detailed description taken in conjunction with the accompanying drawings in which:

DETAILED DESCRIPTION

Figure 1:
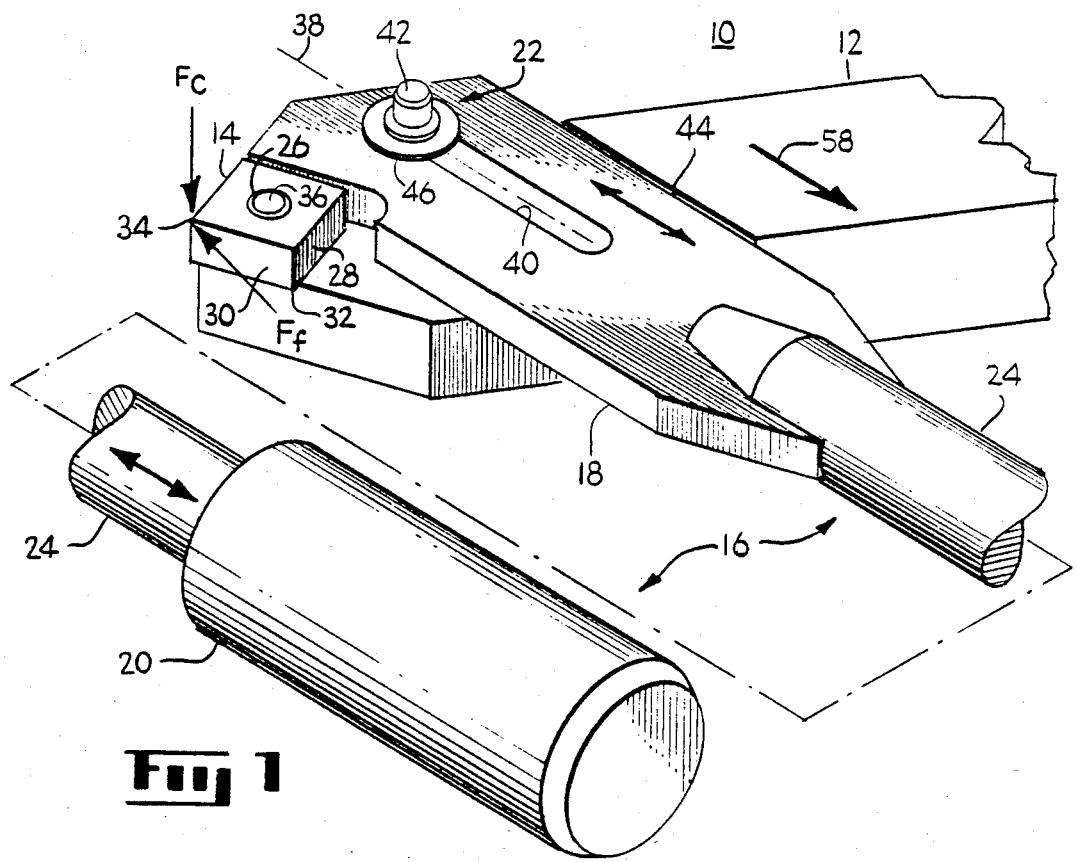
FIG. 1 is a three-dimensional view of one embodiment of a cutting tool having means for automatically indexing a cutting tool insert according to the present invention.
Figure 2:
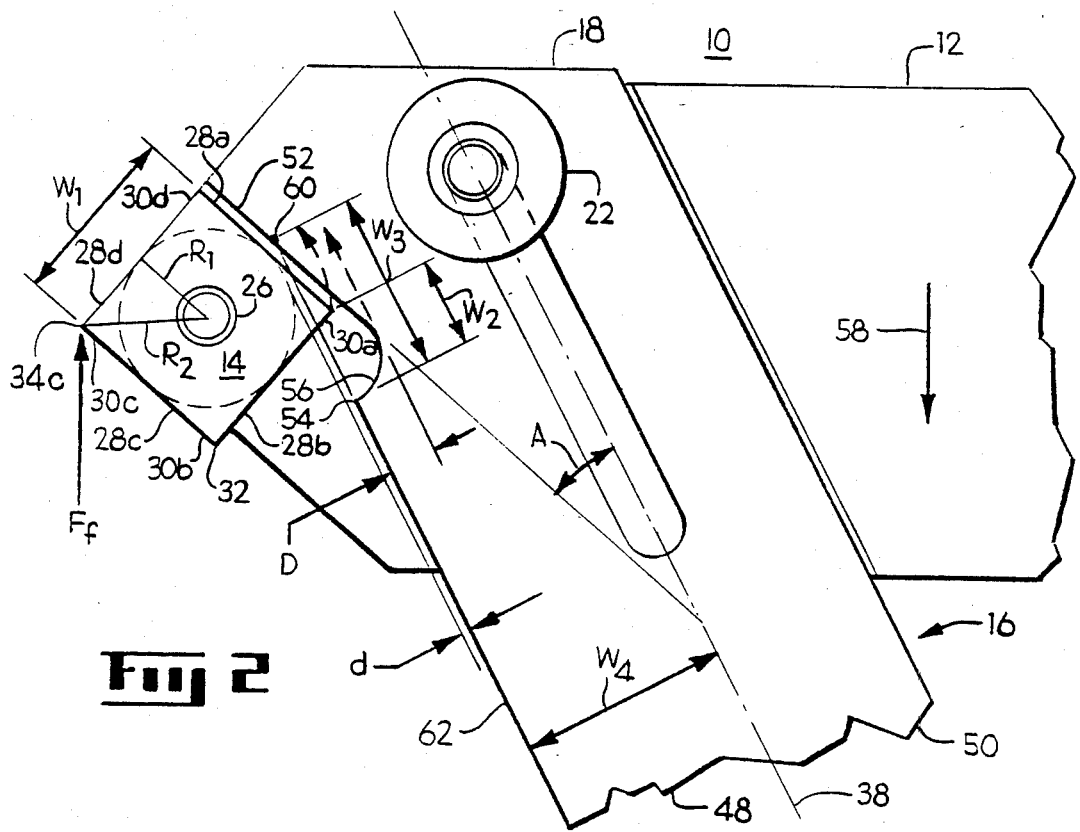
FIG. 2 is an enlarged top view of the cutting tool illustrated in FIG. 1.

Illustrated in FIGS. 1 and 2 is an exemplary embodiment of a cutting tool 10 having an elongated shank or toolholder 12 which may be removably mounted in a cutting machine such as, for example, a lathe, drill or milling machine (not shown). The tool 10 also includes an exemplary indexable square cutting tool insert 14 of width $W_1$, rotatably connected to an end of the shank 12. The insert 14 is conventional and may be made of high-speed steel, carbide, or ceramic or other known compositions.

In accordance with one embodiment of the present invention, the tool 10 also includes means, indicated generally at 16, for indexing the insert 14 which includes an index member 18 and a conventional actuator 20. Means, indicated generally at 22, for movably mounting the index member 18 to the shank 12 are provided and are effective for allowing the index member 18 to extend and retract in response to the output of the actuator 20. The actuator 20 may include, for example, a hydraulic or pneumatic device having an output member 24, suitably connected to the index member 18, which may be extended and retracted upon demand.

A significant feature of the present invention is the relative simplicity of the cutting tool 10 wherein the indexing means 16 acts directly upon the relatively simple insert 14. More specifically, and in accordance with the exemplary embodiment illustrated in FIG. 1, the insert 14 includes a central, aperture 26 and a plurality of circumferentially and symmetrically spaced side surfaces 28 which intersect to define a plurality of tips 30. Each tip 30 has a radially outermost apex 32 and a cutting edge 34 disposed at the apex 32. The shank 12 includes a first pin, or pivot, 36 extending outwardly therefrom and over which the central aperture 26 of the insert 14 is positioned for obtaining rotation thereabout.

The index member 18 in the preferred embodiment illustrated comprises a slider 18 having a substantially straight longitudinal axis 38. The mounting means 22 is effective for allowing the slider 18 to translate only in a direction substantially parallel to the longitudinal axis 38. This may be accomplished, for example, by a mounting means 22 which includes a central elongated slot 40 in the slider 18 which is disposed substantially parallel to the longitudinal axis 38. Furthermore, the shank 12 also includes a second pin 42 extending outwardly therefrom and through the slot 40, and a shoulder 44 against which the index member 18 may slidingly engage. Retention means 46 such as a washer may be fixedly attached to the outer end of the second pin 42 for securing the slider 18 to the shank 12 to allow the slider 18 to translate along the slot 40 and slide against the shoulder 44.

Details of the cutting tool 10 are more particularly illustrated in FIG. 2 wherein the slider 18 is illustrated in a retracted position and the insert 14 is illustrated in a stationary cutting position. The slider 18 of the indexing means 16 further includes first and second sides 48 and 50, respectively, between which the longitudinal axis 38 is disposed generally parallel thereto. The slider 18 also includes on the first side 48 thereof, a preferably substantially flat locking surface 52 disposed at one end thereof, a cam lobe 54 spaced inwardly thereof, and a recess 56 disposed between the locking surface 52 and the cam lobe 54. In this cutting position, the insert 14 is positioned with respect to the slider 18 so that the insert side surface 28a and the tip 30a are disposed between the slider locking surface 52 and the cam lobe 54, and insert tip 30c is in position for cutting.

The indexing means 16 is effective for positioning successive ones of the tips 30 into the illustrated cutting position upon successive extensions and retractions of the slider 18. In particular, the cam lobe 54 pushingly engages one of the tips, for example 30a, upon extension of the slider 18 with the recess 56 accommodating the tip 30a as the insert 14 is caused to rotate about the pivot 36. The locking surface 52 is thereafter securely positioned against one of the insert side surfaces, 28a as shown, for locking the insert 14 in the cutting position upon retraction of the slider 18.

More specifically, the slider locking surface 52 is preferably disposed obliquely to the longitudinal axis 38 thereof and defines an angle A therewith. With the slider 18 disposed in a retracted position as shown, the locking surface 52 is securely positioned, or wedged, against the first side surface 28a of the insert 14 and prevents rotation thereof. The angle A may be substantially zero in magnitude; however, conventional manufacturing tolerances might allow the insert 14 to then jiggle with respect to the slider 18 during cutting. Accordingly, an angle A of greater than about zero degrees, and, in the embodiment shown, of about 22.5 degrees is preferred.

With an obliquely disposed locking surface 52, retraction of the slider 18 will force the locking surface 52 against the insert first side surface 28a thereby locking the insert 14 in the stationary cutting position. Furthermore, the obliqueness of the locking surface 52 with respect to the insert 14 is such that the insert 14 is subject to self-locking forces due to the cutting operation itself.

More specifically, the shank 12 which carries the insert 14 travels in a direction 58, which, as illustrated in FIG. 2, is in an up-to-down direction. A reaction feed force $F_f$ acting transversely against the cutting edge 34c of the insert tip 30c during cutting operation acts in an upward direction as shown which tends to rotate the insert 14 in a clockwise direction. A reaction cutting force $F_c$, in contrast, acts primarily normal to the insert 14 at cutting edge 34c, as illustrated in FIG. 1, and, therefore, is not a significant contribution to the self-locking force in this embodiment of the invention.

The slider locking surface 52 is angled with respect to the longitudinal axis 38 so that the retraction force of the slider 18 on the insert 14 tends to rotate the insert 14 in a direction equal to the direction which is tended to be caused due to the reaction force $F_f$; i.e., in a clockwise direction as shown. In this preferred embodiment, this arrangement generates a self-locking force for maintaining the insert 14 in a stationary cutting position. Accordingly, relatively little retraction force from the actuator 20 to the slider 18 is required for maintaining the insert 14 in the cutting position.

For comparison purposes, if the shank 12 were to travel in an opposite, upward direction, to that shown in FIG. 2, the reaction feed force $F_f$ would be opposite in magnitude and would tend to rotate the insert 14 in a counter clockwise direction which would tend to separate the locking surface 52 from the insert first side surface 28a. However, although the operation of this comparison example is different than that described above, it is believed that different self-locking forces can nevertheless be generated thereby.

As the cutting edge 34c of the tip 30c becomes worn, the insert 14 is rotated in a counter clockwise direction to index into position the succeeding tip 30d. To accomplish this rotation, the cam lobe 54 is translated substantially parallel to the longitudinal axis 38 and pushingly engages insert tip 30a to cause rotation of the insert 14. Rotation will be effected when the cam lobe 54 is positioned to travel between a circle of radius $R_1$ inscribed in the insert 14, which contacts the side surfaces 28, and a circle of radius $R_2$ extending to the apexes 32 of the tips 30. Both $R_1$ and $R_2$ are measured from an origin at the center of the aperture 26. With this preferred arrangement, the cam lobe 54 can push against the side surface 28b at the tip 30a to cause rotation of the insert 14 without binding.

In the initial cutting position of the insert 14 as shown in FIG. 2, the cam lobe 54 is generally spaced from the tip 30a, a distance $W_2$. The recess 56 has a depth D which is effective for accommodating the distance $R_2 - R_1$ as the insert 14 is caused to rotate during indexing. The spacing $W_2$ and the recess 56 allow the slider 18 to initially translate and allow the locking surface 52 to be spaced away from the insert side surface 28a before the cam lobe 54 engages the tip 30a. This arrangement allows the insert 14 to be rotated without binding against the slider 18.

In a preferred embodiment, the cam lobe 54 is spaced a distance $W_3$ from a point 60 of the locking surface 52 which is defined by the projection of the cam lobe 54, in a straight line path parallel to the direction of translation, against the locking surface 52. Point 60 may alternatively be defined as the contact point of the inscribed circle of radius $R_1$ against the locking surface 52. The distance $W_3$, in the embodiment illustrated, is preferably equal to about the width $W_1$, the length of the side surface 28 of the square cutting tool insert 14. This arrangement of the locking surface 52, the recess 56 and the cam lobe 54 allows for rotation of the insert 14 without binding against the slider 18 during extension thereof and locking of the insert 14 in an indexed position upon retraction of the slider 18.

The slider 18 may also include a relief surface 62 on the first side 48 thereof which extends from the cam lobe 54 in a direction substantially parallel to the longitudinal axis 38 and spaced therefrom a distance $W_4$. The relief surface 62 is positioned at the distance $W_4$ for obtaining a suitable clearance d between the relief surface 62 and the inscribed circle of radius $R_1$ of the insert 14. The clearance d is effective for allowing slider 18 to translate past the insert 14 during indexing without interference against the succeeding insert side surface 28b.

The operation of the indexing means 16 is more particularly illustrated in the sequence of figures of FIG. 3. FIG. 3A illustrates the slider 18 in a fully retracted position with the insert 14 in a locked stationary cutting position. $F_a$ represents the force applied by the actuator 20 on the slider 18. In FIG. 3B, the slider 18 begins its extension stroke and the cam lobe 54 thereof engages insert tip 30a on insert side surface 28b, with the recess 56 accommodating the tip 30a to prevent it from binding against the slider 18.

Figure 3A:
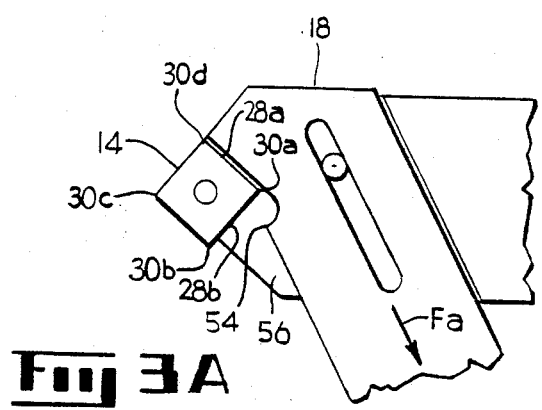
FIGS. 3A-3G illustrate a sequence of positions of the cutting tool illustrated in FIG. 1 which occurs during indexing of the cutting tool insert.
Figure 3E:
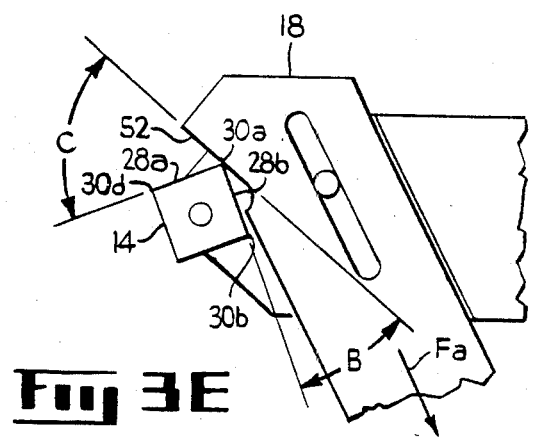
Figure 3B:
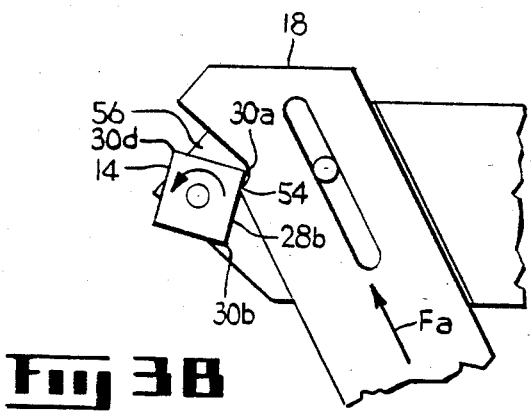
Figure 3F:
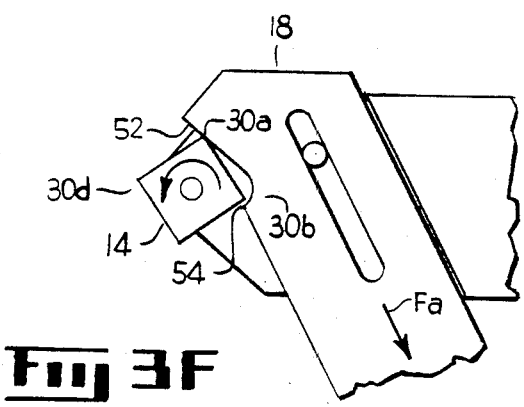
Figure 3C:
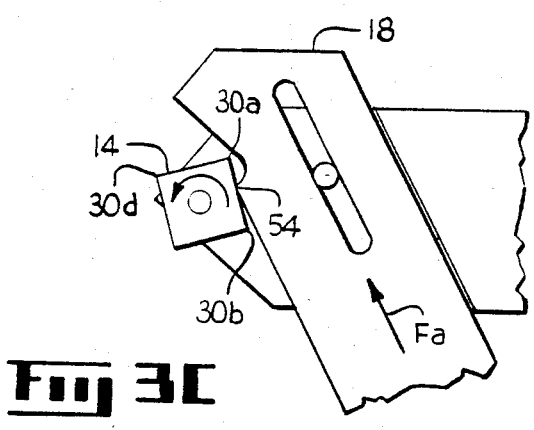
Figure 3G:
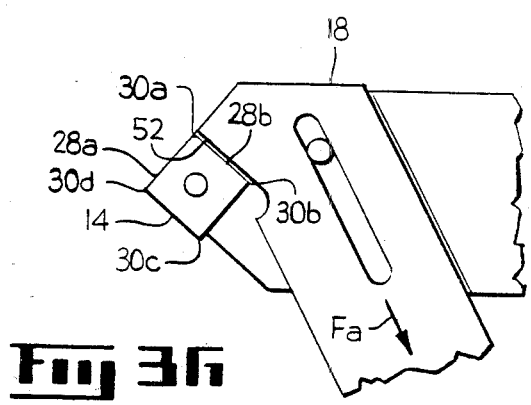
Figure 3D:
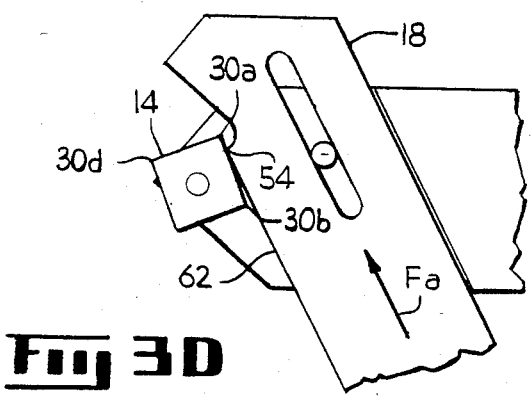

In FIGS. 3C and 3D, the cam lobe 54 pushingly engages the insert tip 30a to cause rotation of the insert 14. Indexing of a square insert 14 requires a rotation of 90 degrees which is substantially accomplished at the end of the extension stroke position of the slider 18 as shown in FIG. 3D. The slider relief surface 62 is spaced from the insert 14 for avoiding interference therewith.

In FIG. 3E, slider 18 begins its retraction stroke and the slider locking surface 52 contacts the insert tip 30a on the succeeding insert side surface 28b. The angle A of the slider locking surface 52 is chosen also with respect to the insert tip 30a in the position shown to prevent binding and for allowing the slider locking surface 52 to complete the remainder of the rotation of the insert 14 prior to the locking thereof. For example, the angle B formed between the insert side surface 28b and the slider locking surface 52 is less than a complementary angle C formed between the insert side surface 28a and the surface 52.

FIG. 3F illustrates the slider locking surface 52 causing final rotation of the insert 14 with the succeeding insert tip 30b clearing the cam lobe 54. FIG. 3G is identical to FIG. 3A with the slider 18 in a fully retracted position but with the locking surface 52 securely positioned against the succeeding insert side surface 28b and with the worn insert tip 30c being indexed and replaced by the succeeding unworn insert tip 30d.

Accordingly, it will be appreciated that the cutting tool 10 including the indexing means 16 acting directly upon the insert 14 in accordance with this exemplary embodiment of the present invention provides a relatively simple arrangement for indexing and locking the insert 14.

Figure 4:
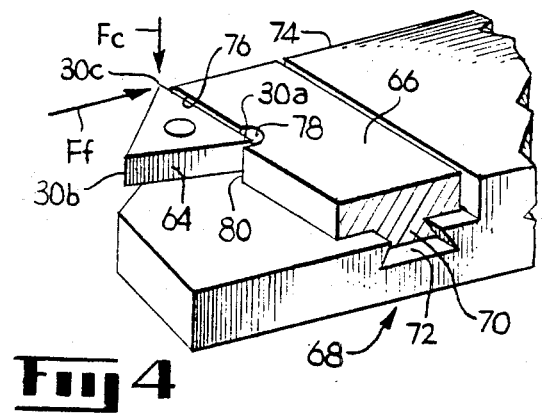
FIG. 4 illustrates a three-dimensional view of a second embodiment of the present invention.

Illustrated in FIG. 4 is an alternative embodiment of the present invention including a cutting insert 64, having an equilateral triangular shape, and a slider 66. Mounting means 68 effective for allowing translation of the slider 66 is provided and comprises, in this embodiment of the invention, an integral dovetail 70 extending from an inner surface of the slider 66 which is disposed in a complementary shaped slot 72 disposed in a shank 74.

The slider 66 similarly includes a locking surface 76, a recess 78 and a cam lobe 80. In this embodiment, the insert tip 30c immediately adjacent to the locking surface 76 is used for cutting instead of the insert tip 30b which is disposed outwardly-most from the locking surface 76. Of course, either insert tip 30b or 30c may be chosen for the actual cutting tip.

Furthermore, the angle of orientation of the slider locking surface 76, the dimensions of the recess 78 and the relative position of the cam lobe 80 are suitably determined for allowing the triangular insert 64 to be rotated and indexed in successive positions in a manner similar to that utilized for the square insert 14 illustrated in FIG. 2.

While there have been described herein what are considered to be preferred embodiments of the invention, other modifications will occur to those skilled in the art from the teachings herein. For example, although either square or triangular cutting inserts have been disclosed, other multisurface cutting inserts may also be used. In particular, a diamond-shaped cutting insert having two oppositely disposed cutting tips may be used. However, two successive extension and retraction strokes are required to index this insert between successive cutting tips. Furthermore, inserts having curved side surfaces may be used.

Although the preferred embodiments illustrate a slider directly indexing the cutting tool insert itself, the slider may be utilized to index a similar multisided insert having an integral cutting member extending therefrom. It is also envisioned that the indexing member could be effective for sliding along a circular arc for obtaining indexing of a cutting tool insert upon extension and retraction thereof.

Having thus described preferred embodiments of the invention, what is claimed as novel and desired to be secured by Letters Patent of the United States is:

1. A cutting tool comprising:
   a shank;
   an indexable cutting tool insert having a side surface and a tip;
   means rotatably connecting said insert to said shank including a pivot extending between said shank and said insert for allowing said insert to rotate with respect to said shank;
   means to index said insert comprising an index member having a locking surface and a cam lobe thereon; and
   means movably mounting said index member to said shank;
   said indexing means being effective for rotating said insert upon extension of said index member so that said cam lobe pushingly engages said insert side surface at said insert tip, and locking said insert in a stationary cutting position upon retraction of said index member so that said locking surface is securely positioned against said insert side surface.

2. A cutting tool according to claim 1 wherein said insert further comprises a plurality of circumferentially spaced cutting edges and said indexing means is effective for positioning successive ones of said cutting edges into said cutting position upon successive extensions and retractions of said index member.

3. A cutting tool according to claim 1 wherein said locking surface is substantially flat.

4. A cutting tool according to claim 1 wherein said insert further includes a plurality of circumferentially spaced ones of said side surfaces intersecting to define a plurality of circumferentially spaced ones of said tips therebetween, each of said tips having a cutting edge, and said indexing means being effective for positioning successive ones of said cutting edges into said cutting position upon successive extensions and retractions of said index member.

5. A cutting tool according to claim 4 wherein said cutting edges are symmetrically spaced around said insert.

6. A cutting tool according to claim 5 wherein said insert has an equilateral triangular shape.

7. A cutting tool according to claim 5 wherein said insert has a square shape.

8. A cutting tool according to claim 1 wherein said connecting means includes said insert including a central aperture therein and said shank including a first pin extending outwardly therefrom to define said pivot, said central aperture being positioned around said first pin for allowing rotation of said insert with respect to said shank.

9. A cutting tool according to claim 1 wherein said index member comprises a slider having first and second sides and a longitudinal axis spaced therebetween, said locking surface and said cam lobe being disposed on said slider first side, said slider being movably mounted to said shank for allowing extension and retraction motion in a direction substantially parallel to said longitudinal axis.

10. A cutting tool according to claim 9 wherein said slider longitudinal axis is substantially straight and said slider is translatable only.

11. A cutting tool according to claim 10 wherein said insert side surface and tip are disposed between said slider locking surface and cam lobe during said cutting position.

12. A cutting tool according to claim 10 wherein said slider locking surface is disposed obliquely to said longitudinal axis so that said slider is wedged against said insert side surface in said cutting position.

13. A cutting tool according to claim 12 wherein said slider cam lobe is spaced from said insert tip in said cutting position.

14. A cutting tool according to claim 12 wherein said slider locking surface is disposed obliquely to said longitudinal axis so that retraction force of said slider on said insert tends to rotate said insert in a direction equal to that which is tended to be caused due to reaction feed forces acting against said insert during cutting for providing self-locking of said insert during cutting operation.

15. A cutting tool according to claim 14 wherein said slider locking surface is oriented at an angle A equal to about 22.5 degrees with respect to said longitudinal axis.

16. A cutting tool according to claim 12 wherein said slider includes a recess disposed between said locking surface and said cam lobe which is effective for accommodating said insert tip as said insert is indexed.

17. A cutting tool according to claim 16 wherein said slider recess has a depth D and said insert includes a radius $R_1$ from said pivot to said side surface and a radius $R_2$ from said pivot to an apex of said tip, said depth D having a magnitude effective for accommodating the distance $R_2 - R_1$ during indexing of said insert.

18. A cutting tool according to claim 17 wherein said slider further includes a relief surface extending from said cam lobe and disposed substantially parallel to said longitudinal axis, said relief surface being spaced with respect to said insert at said radius $R_1$ to define a clearance d effective for allowing said slider to translate past said insert during indexing without interference.

19. A cutting tool according to claim 18 wherein a distance $W_3$ is defined between said cam lobe and a point of said locking surface defined by projection of said cam lobe thereagainst, and said insert has a width $W_1$ defined between adjacent tips, and wherein $W_3$ is generally equal to $W_1$.

20. A cutting tool according to claim 10 wherein said index member mounting means comprises:
said slider including a central elongated slot aligned parallel to said longitudinal axis;
said shank including a shoulder against which said slider second side is slidable and a second pin extending outwardly therefrom and through said slider slot; and
said second pin having a retention means at an outer end thereof for securing said slider in sliding engagement against said shank.

21. A cutting tool comprising:
a shank;
an indexable cutting tool insert having a plurality of circumferentially spaced side surfaces and tips;
means rotatably connecting said insert to said shank including a pivot extending between said shank and said insert for allowing said insert to rotate with respect to said shank;
means to index said insert comprising an index member including a locking surface and a cam lobe thereon, and a recess disposed between said locking surface and said cam lobe in said index member; and
means for movably mounting said index member to said shank;
said indexing means being effective for positioning successive ones of said tips into a cutting position upon successive extensions and retractions of said index member so that said cam lobe pushingly engages one of said insert side surfaces at one of said tips upon extension of said index member, said recess accommodating said tip as said insert is caused to rotate about said pivot, and said locking surface being securely positioned against said one of said insert side surfaces for locking said insert in said cutting position upon retraction of said index member.

22. A cutting tool according to claim 21 wherein said index member mounting means is effective for allowing translation only of said index member about a longitudinal axis thereof, said locking surface is positioned obliquely to said longitudinal axis, and said cam lobe is spaced from one of said tips in a retracted position of said index member.

23. A cutting tool according to claim 22 wherein said insert is square having a width $W_1$ and includes an inscribed circle contacting said locking surface at a point disposed a distance $W_2$ from said cam lobe which is generally equal to $W_1$, said locking surface being disposed at about 22.5 degrees with respect to said longitudinal axis.

24. A cutting tool according to claim 22 wherein said insert is triangular.

25. A cutting tool according to claim 22 wherein said connecting means comprises said insert including a central aperture and said shank including a first pin extending outwardly therefrom to define said pivot, said central aperture being positioned around said first pin for allowing rotation of said insert with respect to said shank.

* * * * *